United States Patent
McKelvey et al.

(10) Patent No.: US 12,352,662 B2
(45) Date of Patent: Jul. 8, 2025

(54) METHOD AND SYSTEM FOR DETERMINING BLOCK CYCLES FOR AN ELASTOMETRIC SUSPENSION BUSHING FOR A VEHICLE INVOLVING DETERMINING MAXIMUM FORCE AND MAXIMUM FORCE ANGULAR DISPLACEMENT FOR THE BUSHING

(71) Applicant: FCA US LLC, Auburn Hills, MI (US)

(72) Inventors: Sean A McKelvey, Shelby Township, MI (US); Zachary T Hitt, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 299 days.

(21) Appl. No.: 18/069,595

(22) Filed: Dec. 21, 2022

(65) Prior Publication Data
US 2024/0210270 A1    Jun. 27, 2024

(51) Int. Cl.
*G01M 5/00* (2006.01)
*F16F 1/38* (2006.01)
*G01M 17/04* (2006.01)

(52) U.S. Cl.
CPC ........... *G01M 5/005* (2013.01); *F16F 1/3807* (2013.01)

(58) Field of Classification Search
CPC .. G01M 13/025; G01M 13/04; G01M 17/045; G01M 13/02; G01M 5/005; G01M 17/0074; G01M 17/007; G01M 17/00; G01M 17/06; G01M 17/0076; B60N 2/501; G01L 5/00; G01L 5/0042; G16C 60/00; F16F 1/3807; G01N 19/04; G01N 33/227; G06F 30/23; A61G 5/06; B60W 30/184; B62D 5/0472; B60C 11/246; B60G 17/019; Y02E 30/30; Y02T 90/00
See application file for complete search history.

(56) References Cited

U.S. PATENT DOCUMENTS

| | | | | |
|---|---|---|---|---|
| 5,497,324 A | * | 3/1996 | Henry ................ | B60G 17/0157 280/5.503 |
| 11,029,234 B2 | | 6/2021 | Svensson | |

FOREIGN PATENT DOCUMENTS

| | | |
|---|---|---|
| CN | 104483112 A | 4/2015 |
| CN | 111024384 A | 4/2020 |

* cited by examiner

*Primary Examiner* — Brandi N Hopkins
(74) *Attorney, Agent, or Firm* — Jeremy J. Klobucar (57) ABSTRACT

A method and system of determining a block cycle for a bushing includes determining event data for a plurality of events corresponding to operating conditions of a vehicle. Based on the event data for each of the plurality of events, data including a maximum force of the bushing and a maximum force angular displacement for the bushing at the maximum force and a minimum force and a minimum force angular displacement are determined. A block cycle is determined comprising the maximum force and maximum force angular displacement and the minimum force and the minimum force angular displacement for the plurality of events.

12 Claims, 7 Drawing Sheets

| Block | Max Load | Min Load | Angle @ Max Load | Angle @ Min Load | Cycles | Frequency |
|---|---|---|---|---|---|---|
| 1 | -2150 | -12000 | 9 | -15 | 10500 | 2 |
| 2 | -2500 | -13000 | 9 | -9 | 1000 | 0.5 |
| 3 | 100 | -20000 | 9 | -12 | 35000 | 2 |
| 4 | -5000 | -10000 | -6 | 6 | 50000 | 2 |
| 5 | 10000 | -40000 | -4 | 6 | 500 | 0.5 |
| 6 | -3000 | -7000 | 4 | -6 | 35000 | 2 |
| 7 | -500 | -13000 | 4 | -2 | 20000 | 2 |
| 8 | -5000 | -7000 | -6 | -5 | 1000 | 0.5 |
| 9 | 15000 | -25000 | 0 | 0 | 10000 | 2 |
| 10 | 2500 | -8000 | 13 | -16 | 2500 | 0.5 |

Table 1 | Table 2

FIG. 6

METHOD AND SYSTEM FOR DETERMINING BLOCK CYCLES FOR AN ELASTOMETRIC SUSPENSION BUSHING FOR A VEHICLE INVOLVING DETERMINING MAXIMUM FORCE AND MAXIMUM FORCE ANGULAR DISPLACEMENT FOR THE BUSHING

TECHNICAL FIELD

The present disclosure relates to bushings for vehicles and, more particularly, to a method for determining parameters for testing bushings.

BACKGROUND

This section provides background information related to the present disclosure which is not necessarily prior art.

Vehicles have elastomeric suspension bushings that are used in nearly every single vehicle. Elastomeric suspension bushings are tested by using loading blocks that are performed in cycles. The repetitive nature is referred to as block cycles. During the development of suspension bushings, the bushings are subjective to loading blocks, either physically or virtually. The block cycle is used to design and validate the bushings.

In current known processes, multi-axis loads are typically not aligned correctly and therefore the loading blocks do not represent the actual vehicle loading. Another problem with currently known bushing development processes is that the tests are typically accelerated to shorten the overall test time. Assumptions are made in reducing the shortened test time that result in creating too much or too little damage to the bushing during the physical or virtual testing. Problems with such bushings typically do not manifest themselves and therefore appear late in the durability development process.

Another issue with previously known block cycles is that due to variations in the people developing the process, the block cycles are inconsistent and therefore are unreliable as between different test developers.

Another approach to testing the durability of a bushing is to perform CAE analysis along with several experimentally determined material properties. However, block cycles are often developed by the original equipment manufacturer and thus the material properties may not be known by the original equipment manufacturer.

SUMMARY

This section provides a general summary of the disclosure and is not a comprehensive disclosure of its full scope or all of its features.

The present disclosure allows a more accurate and repeatable block cycles to be created to be used in testing elastomeric bushings.

In one aspect of the disclosure, a method of determining a block cycle for a bushing includes determining event data for a plurality of events corresponding to operating conditions of a vehicle. Based on the event data for each of the plurality of events, data including a maximum force of the bushing and a maximum force angular displacement for the bushing at the maximum force and a minimum force, and a minimum force angular displacement are determined. A block cycle is determined comprising the maximum force and maximum force angular displacement and the minimum force and the minimum force angular displacement for the plurality of events.

In another aspect of the disclosure, a system for determining a block cycle for a bushing includes a controller programmed to determine event data for a plurality of events corresponding to operating conditions of a vehicle, determine a maximum force of the bushing and a maximum force angular displacement for the bushing at the maximum force and a minimum force and a minimum force angular displacement based on the event data for each of the plurality of events; and determine a block cycle comprising the maximum force and maximum force angular displacement and the minimum force and the minimum force angular displacement for the plurality of events.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
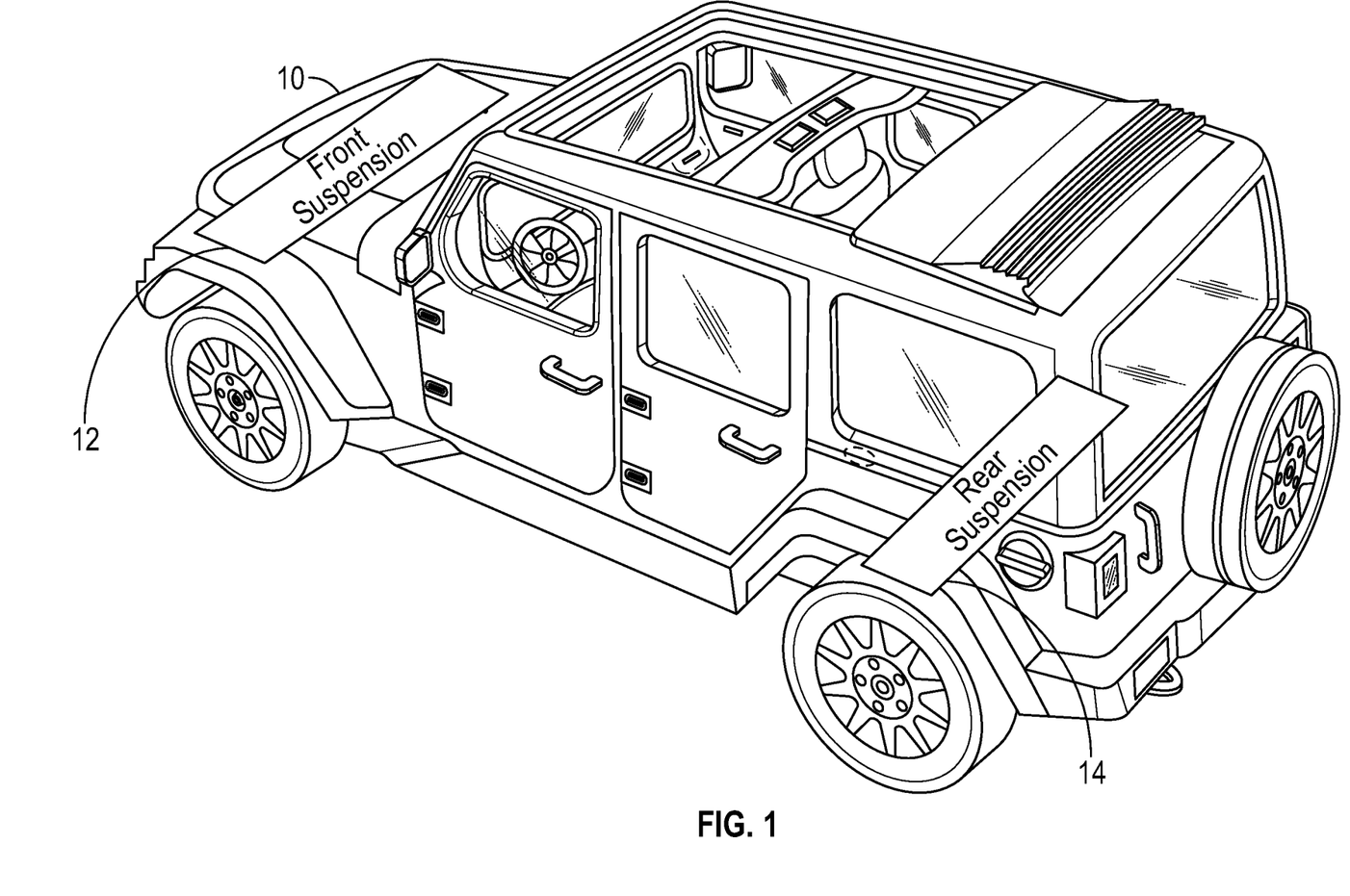
FIG. 1 is a perspective view of a vehicle having a suspension according to the present disclosure.

Referring now to FIG. 1, a vehicle 10 is illustrated having a front suspension 12 and a rear suspension 14. The front suspension 12 may comprise various components and combinations including as MacPherson strut assemblies, shock absorbers, control arms, sway bars, coil springs, stabilizer links, idler arms, tie rods and the like. Various components described above may include bushings. Bushings are used to absorb road bumps, control the amount of movement in the joints and reduce noise and vibration. Bushings allow increased safety, handling and quieter overall operation of the vehicle.

Figure 2:
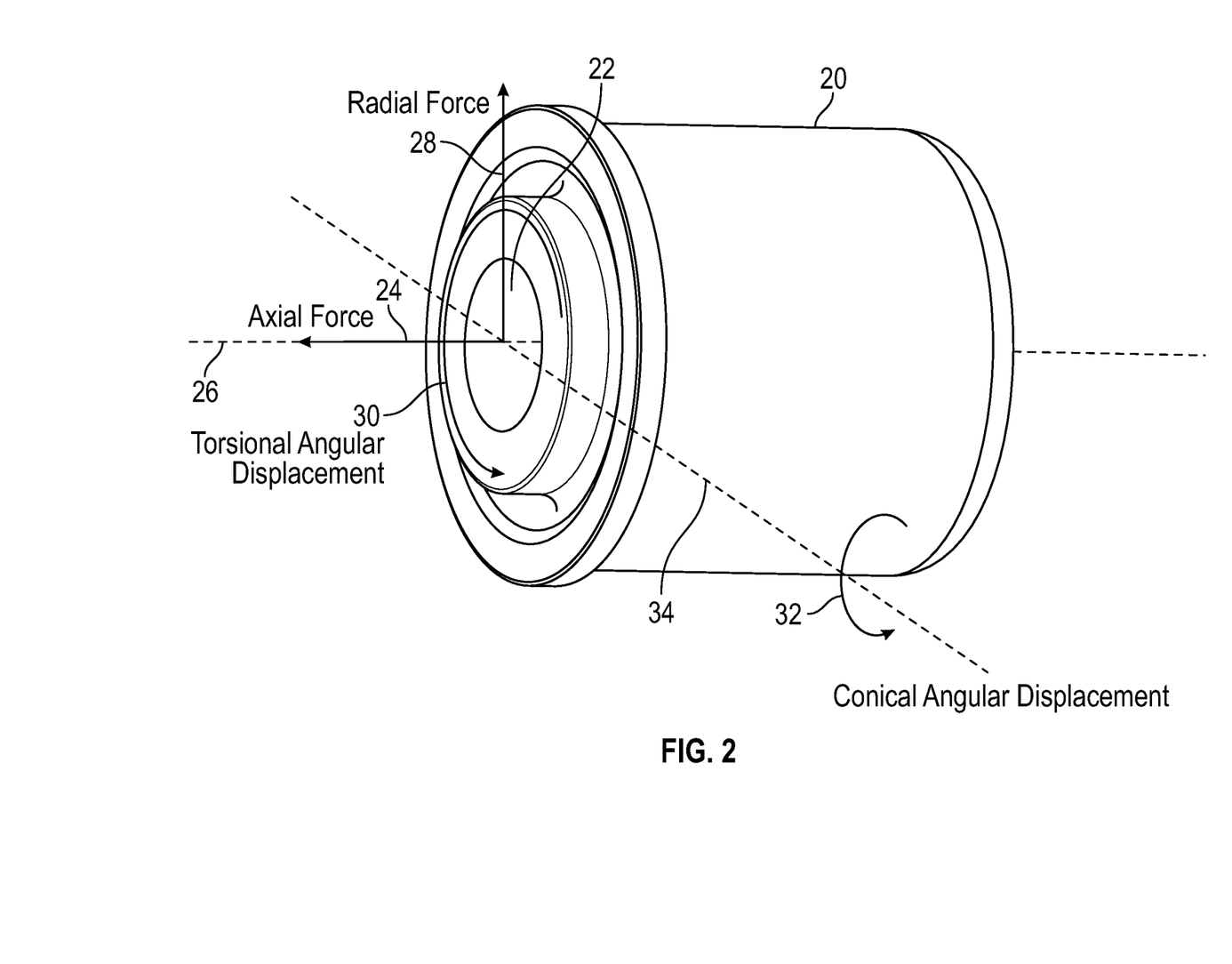
FIG. 2 is an example of a bushing of the suspension of FIG. 1.

Referring now to FIG. 2, one example of a bushing 20 is illustrated. In this example, the bushing 20 is cylindrical in shape and has an axially disposed opening 22 therethrough.

Various forces on the bushing 20 are illustrated. The bushing 20 are subjected to an axial force 24 that extends in the direction of the longitudinal axis 26. A radial force 28 is illustrated in the radial direction of the bushing 20. A torsional angular displacement 30 is illustrated in a direction around the longitudinal axis 26. A conical angular displacement 32 is also illustrated about a radial axis 34, Referring now to FIG. 3A, a plot illustrating an event 310 is set forth. On the upper line, the forces during the event 310 are illustrated by the line 312 representing event data. The event 310 corresponds to a proving ground event. That is, the vehicle may be subjected to various specified conditions to test the vehicle. Event data from the event 310 may be referred to as road data or simply event data. Event data may also be simulated data from a simulator. The events have different forces that vary to obtain testing data. Various peaks and valleys are set forth along the force line 312. At the point 314, a maximum force during the event is experienced. At point 316, a minimum force is experienced for the event 310. A line 320 corresponding to the angular displacement is set forth relative to the event 310. The angular displacement of the line 320 corresponds to the torsional angular displacement 30 illustrated in FIG. 2. Point 322 corresponds to the angular displacement that corresponds to the maximum force at the point 314, a maximum force angular displacement. Point 324 corresponds to the angular displacement at the minimum force point 316, a minimum force angular displacement. That is, the maximum force time at point 314 correspondence to the angular displacement point 322 at the same time $t_1$. The minimum force point 316 and the angular displacement at point 324 occur at the same time $t_2$.

Figure 3A:
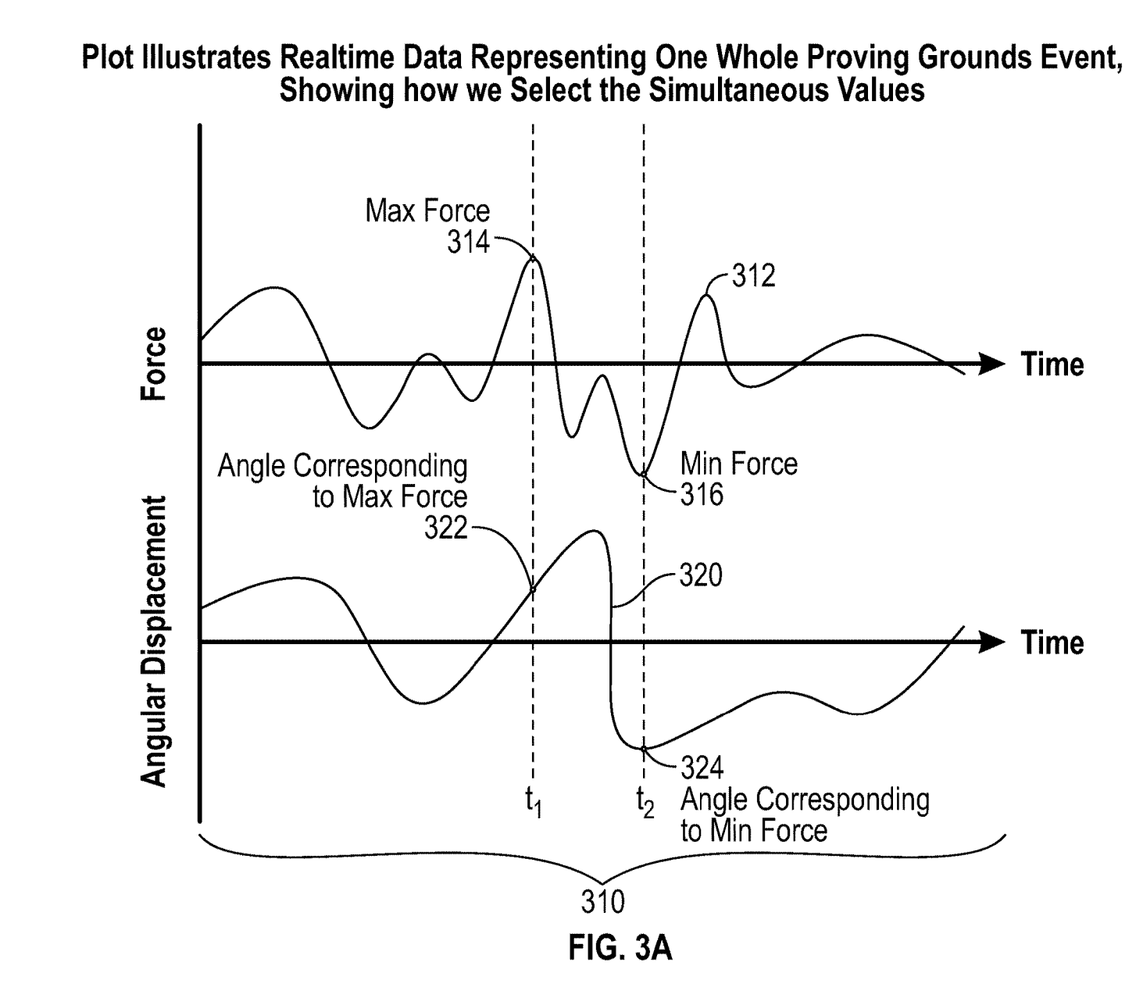
FIG. 3A is a plot of the loading force and angular displacement over time so that the maximum force and the minimum force along with angular displacements are obtained.
Figure 3B:
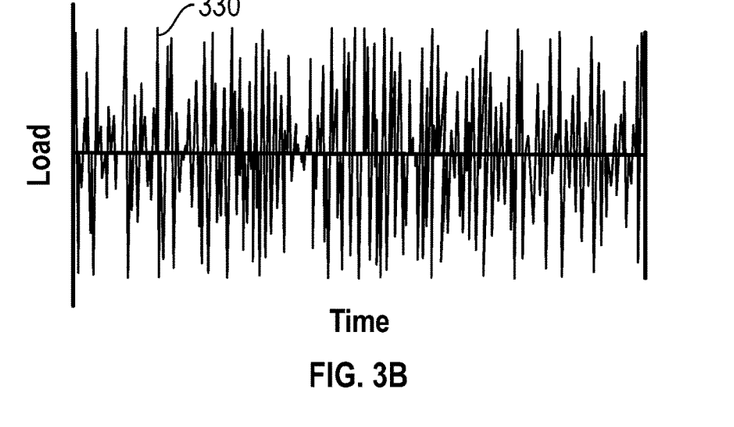
FIG. 3B is a plot of an example of variable amplitude road data.

In FIG. 3B is a data plot of road data 320 either simulated or from a vehicle run on a test cycle on a road. As is illustrated, the load on the bushing increases and decrease with peaks and valleys as the vehicle traverses the road.

Figure 3C:
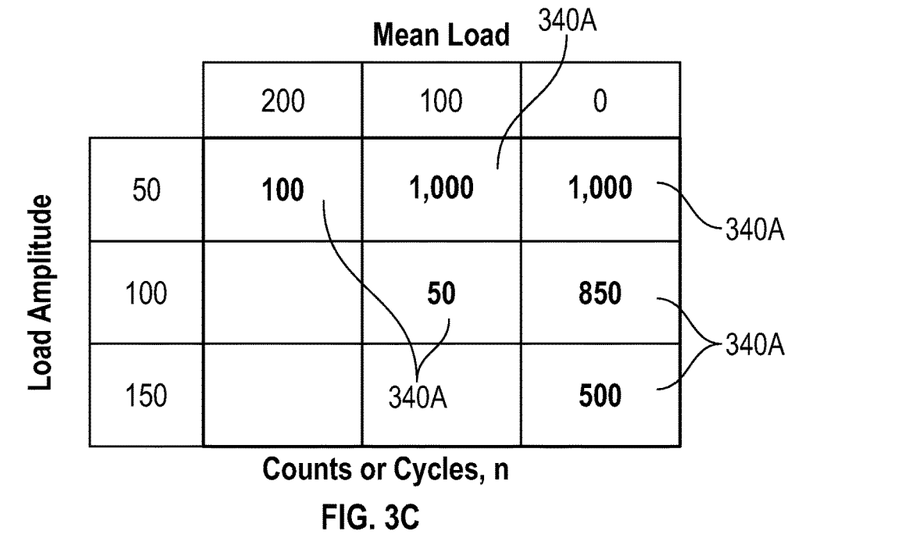
FIG. 3C is an amplitude versus mean load matrix having counts in the appropriate boxes, which correspond to the data in FIG. 3B.

In FIG. 3C the road data used for cycle counting according the data delineations in the table of FIG. 3C. The delineations in this example are 50, 100 and 150 for the load amplitude and 200, 100 and 0 for the mean load table settings. Of course, the data delineations may be divided as a developer sees fit. A plurality of bins 332 in the table of FIG. 3C are illustrated. The variable amplitude loading data are converted into data blocks 340A having constant load amplitude applied at specific mean load levels. The number of cycles for each data block is determined. That is, the road data is used to count the cycles that fall into each data block delineated by the table settings.

The number of counts or cycles for each box in the mean load versus amplitude table is determined from FIG. 3B based on the load data using a rain flow cycle counting algorithm. The first block 340A in FIG. 3C has a 200 mean load and is 100 cycles long with load amplitude of 50. The mean load is a horizontal line through the middle of the box (the average or mean) in FIG. 3D. The second bin in FIG. 3C has a 100 mean load (closer to the X axis than the first box) and is 1000 cycles long with a load amplitude of 50. The third bin in FIG. 3C has a 100 mean load (same distance to the X axis from the center of the box as the second box) and is 50 cycles long with load amplitude of 100. The fourth, fifth and six bins in FIG. 3C have a 0 mean load (centered on the X axis) and have variable load amplitudes or 50, 100 and 150 respectively. The number of cycle lengths are 1000, 850 and 500 as illustrated as the shortening X axis length of each from the fourth box to the sixth box.

Figure 3D:
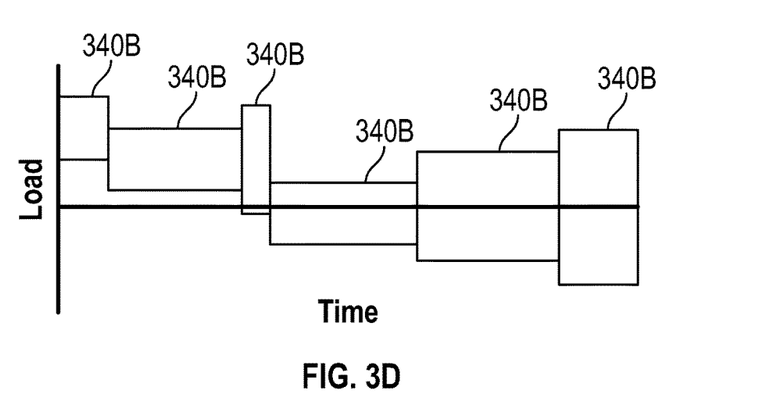
FIG. 3D shows the data of the table in FIG. 3C. for visualization purposes. The blocks of constant amplitude loading shown in 3D are equivalent to the variable amplitude loading shown in FIG. 3B.

In FIG. 3D an example of a rain flow histogram developed from the road data. FIG. 3D is simply a visualization of the data in FIG. 3C and is not used in testing.

Figure 4:
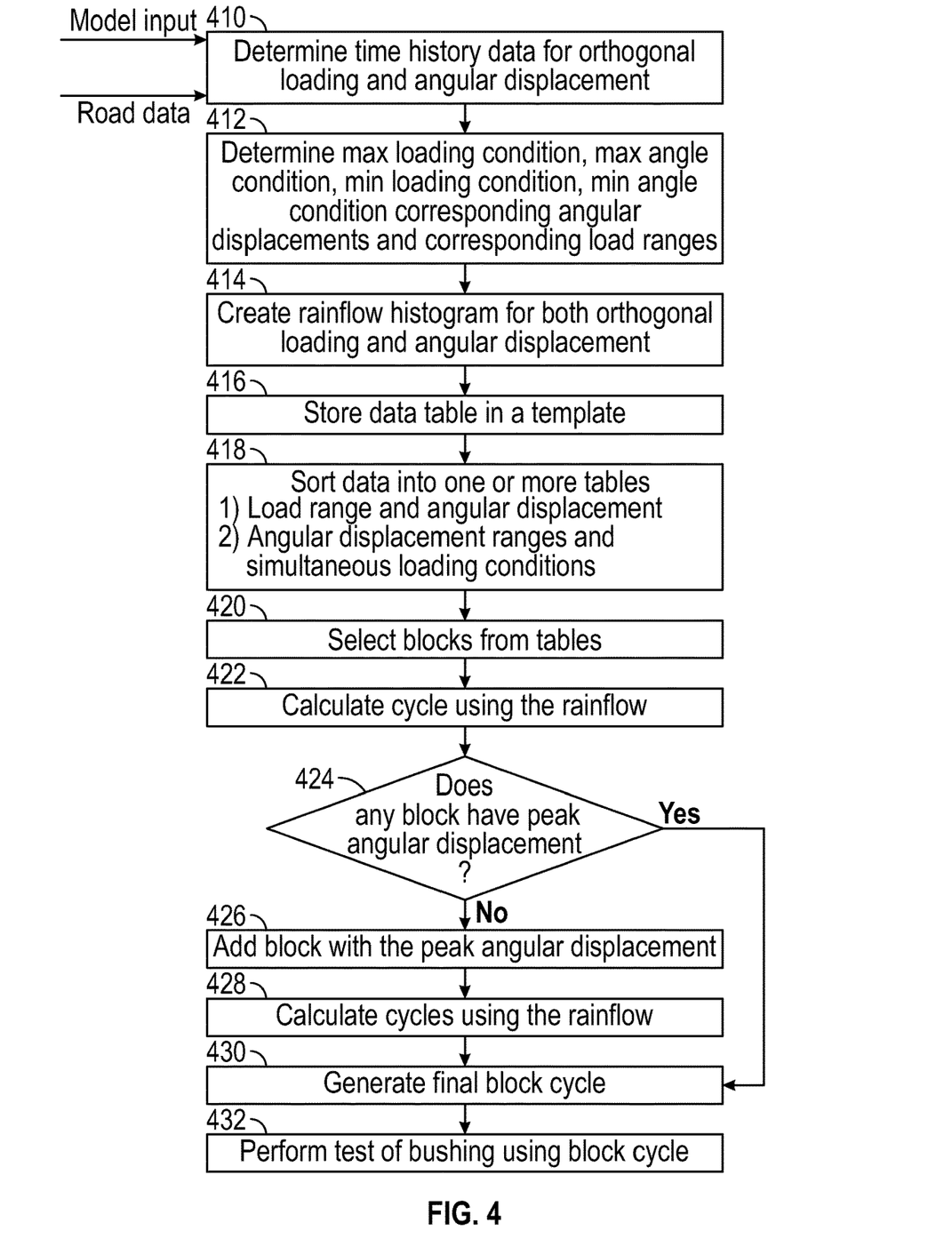
FIG. 4 is a flowchart of a method for obtaining a block cycle according to the present disclosure.

Referring now to FIG. 4, a method for forming a final block cycle is set forth. In step 410, the time history data for orthogonal loading and angular displacement of the bushing is set forth. The orthogonal loading corresponds to the axial force 26 and radial force 28 illustrated in FIG. 2. The angular displacement corresponds to the torsional angular displacement 30 and the conical displacement 32 illustrated in FIG. 2. The time history data is obtained from a model input which is a mathematical model of the vehicle. Road data may also be input to step 410. Road data may be achieved by driving a vehicle, such as prototype vehicle, on the track that is instrumented with different types of instrumentation. Various events may be determined from the time history data.

In step 412, the maximum loading condition, the maximum angle condition, the minimum loading condition, the minimum angle condition, the corresponding angular displacements and the corresponding load ranges are determined for each of the events. That is, the maximum force at time $t_1$ is determined along with a corresponding torsional angular displacement also at time $t_1$. Likewise, the minimum force at time $t_2$ is determined along with the corresponding torsional angular displacement at time $t_2$ as illustrated in FIG. 3A.

In step 414, a rain flow histogram for both the orthogonal loading and the angular displacement is determined. An example is provided in FIGS. 3B and FIG. 3C.

In step 416, a data table may be formed into a template for processing.

Figure 5:
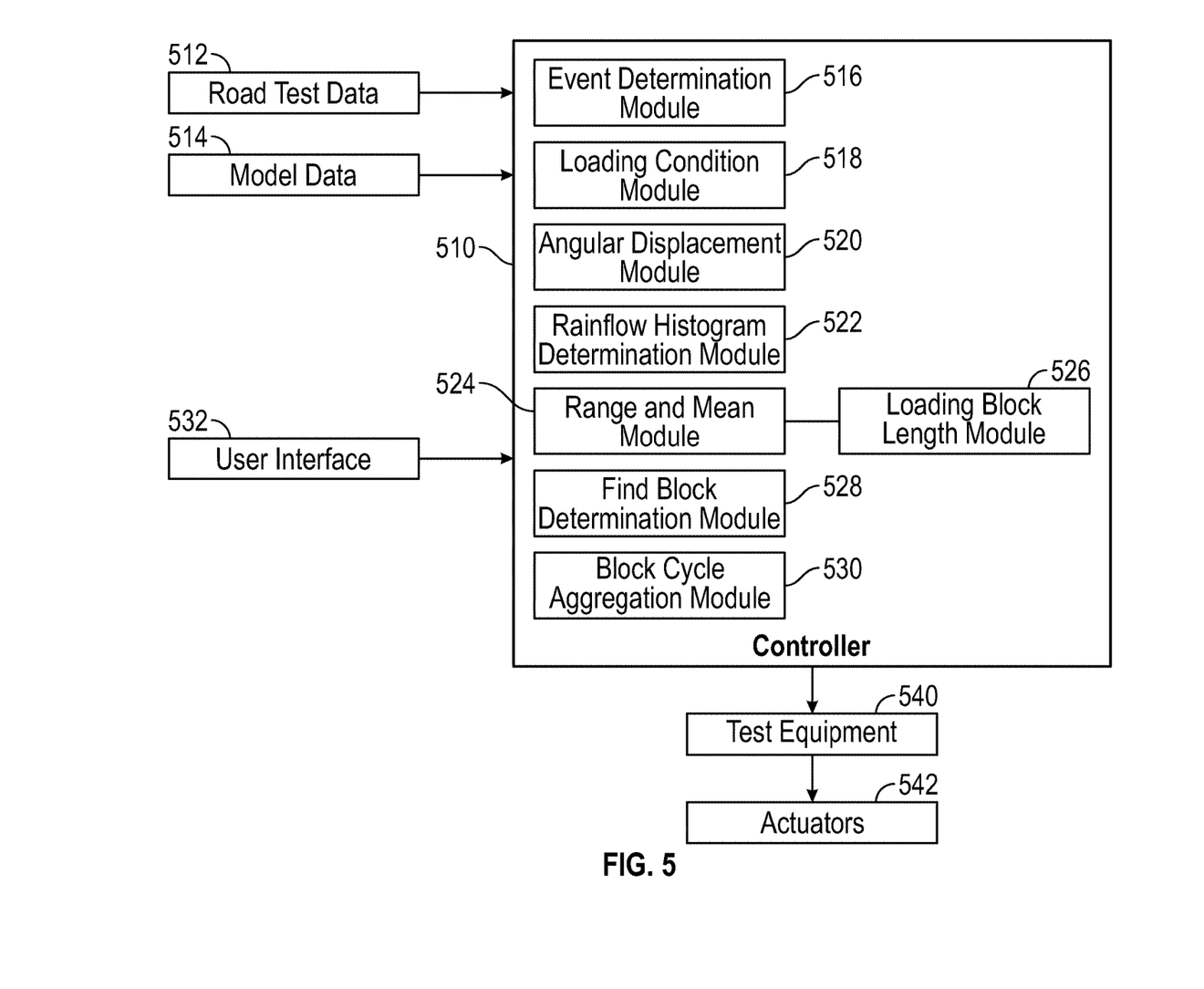
FIG. 5 is a system for forming a block cycle test for an elastomeric suspension bushing.

In step 418, one or more data tables may be formed that have the load or force range and angular displacement as well as the angular displacement ranges and simultaneous loading conditions. A sample table is illustrated in FIG. 5 below. In step 420, blocks from the tables may be selected for running a test. Some blocks may be determined as repetitive or not providing enough stress to make a difference. These blocks may be eliminated.

In step 422, the number of cycle counts are calculated using the rain flow histogram and formed into the table of FIG. 3C. In step 422, a linear correlation is assumed between the load and cycles. The specific range the load fits in the rain flow is used to calculate a slope and intercept with $Y=mX+b$ where Y is your load range and X is your total cycles across the load range.

In step 424, it is determined from the plurality of blocks within the table whether a peak angular displacement is present. In step 424, if the peak angular displacement is not provided in the table, a block with the peak angular displacement may be added to the table in step 426. After step 424 determines that a block does have the peak angular displacement and after the block is added with the peak angular displacement in step 426, step 430 generates a final block cycle. In step 428 the number of cycles for the final block cycle are calculated in a similar manner to step 422. After step 430, a test may be run on a fixture using the block cycles determined above in step 432.

Referring now to FIG. 5, a controller 510 for forming a block cycle is illustrated. The controller 510 is programmed to generate block cycles for performing an elastomeric bushing test. The controller 510 is programmed to perform other functions described in the following. The controller 510 receives road test data 512 or model data 514 as described above. The road test data and model data are parsed to determine various events in the event determination module 516. The event determination module 516 parses the data into events which are communicated to the loading condition module 518. The loading condition module 518 determines the loading condition within each event. The loading condition includes the maximum force and the minimum force for each event. It also identifies the angles corresponding to the maximum and minimum force for each event as illustrated in FIG. 3A above.

An angular displacement module 520 determines the angular displacement condition within each event. The loading condition includes the maximum and minimum angular displacements for each event. The angular displacement module also identifies the forces corresponding to the maximum and minimum angular displacements.

Based on the loading conditions and the angular displacement for each of the events, a rain flow histogram may be developed in the rain flow histogram module 522.

A range and mean module 524 may be used to obtain and mean of the data from the histogram determination module. The range and mean module 524 is used to determine the loading block lengths in the loading block length module 526. The loading block length corresponds to the number of cycles to perform for each loading condition.

A final block determination module 528 is used to determine if the peak angular displacement is within one of the previous blocks. If the peak angular displacement range is not in one of the previous blocks, a block having the peak angular displacement is added. In block 530, the chosen blocks from the loading block length determination module, the final block determination module and the angular and loading conditions are aggregated in the block cycle aggregation module 530. User input to the system may be provided by a user interface 532. The user interface may be a keyboard, touch screen or other type of user input to assist in selecting. However, the system may be completely automated. Ultimately, the aggregated block cycle is communicated to test equipment 540. The test equipment may perform testing on the elastomeric bushing. For example, actuators 542 may be used to provide stresses and strains on the elastomeric bushing to obtain the loading conditions and the angular displacements specified in each of the blocks of the block cycle.

Figure 6:
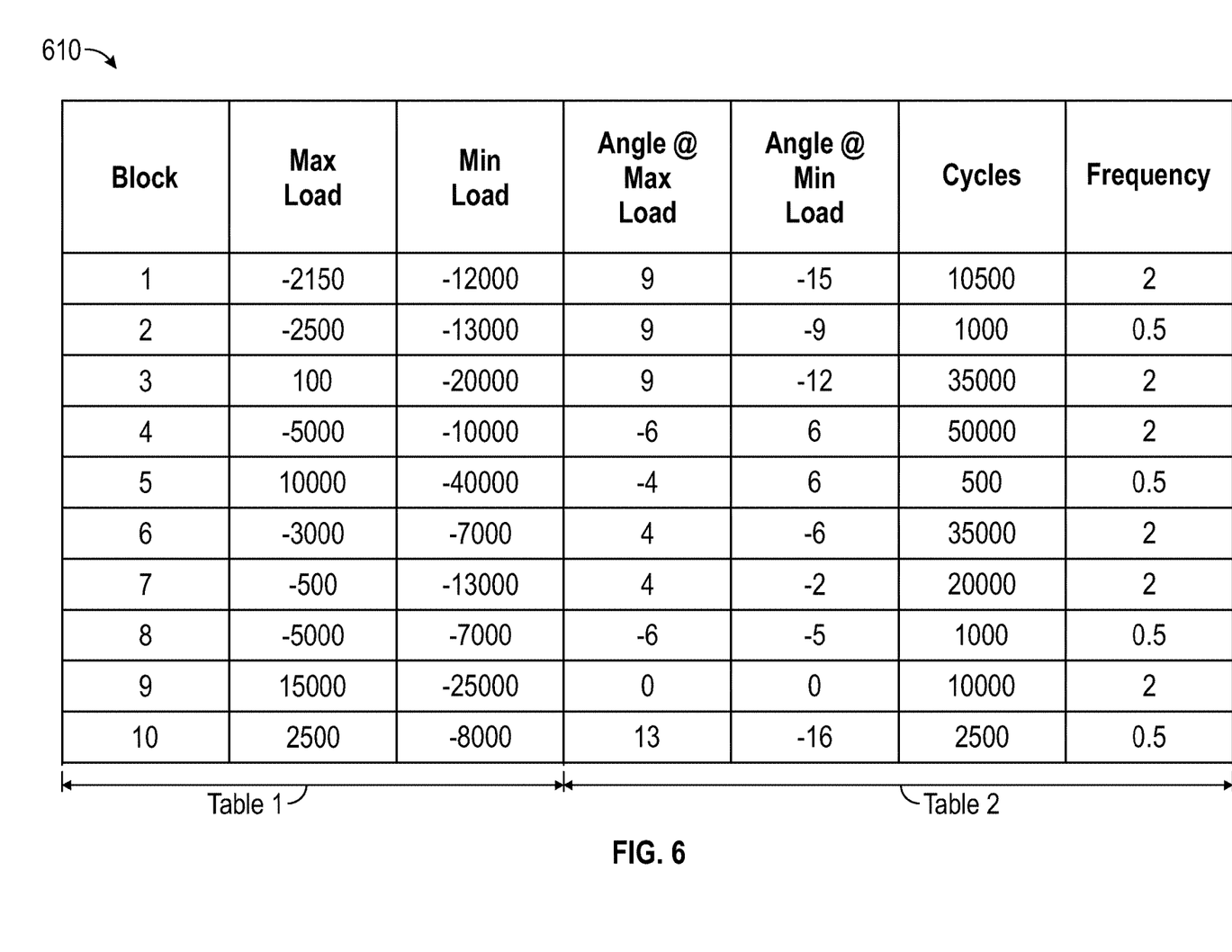
FIG. 6 is an example of a final block cycle.

Referring now to FIG. 6, an example of a block cycle in the form of a table is illustrated. The block cycle table includes ten block cycles in this example. Each block cycle has a maximum force or load (Max Load), a minimum force or load (Min Load). Likewise, the torsional angular displacement is illustrated as the angle at Max Load. Likewise, the angle at Min Load is also provided in the block cycle. The number of cycles is also determined. The number of cycles corresponds to the number of times that the bushing is to be subjected to the loading during testing. A frequency or cycles per second is also provided in the table. The frequency is chosen so that the elastomeric bushing is not overheated during testing. The cycles are determined by the use of a range/mean histogram of the dominant multi-axis load or displacement. By performing this in this manner, the loading blocks are applied for a representative number of cycles which prevents over testing and undertesting. During testing, the process was shown to have a consistent correlation with vehicle testing.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of determining a block cycle for a bushing comprising:
   determining event data for a plurality of events corresponding to operating conditions of a vehicle based on a mathematical model of the vehicle;
   receiving the event data at a controller;
   based on the event data for each of the plurality of events, determining, by the controller, a maximum force of the bushing and a maximum force angular displacement for the bushing at the maximum force and a minimum force and a minimum force angular displacement;
   determining, at the controller, a plurality of block cycles, each comprising the maximum force and maximum force angular displacement and the minimum force and the minimum force angular displacement for the plurality of events;
   aggregating, at the controller, the plurality of block cycles to form an aggregated block cycle;
   communicating the aggregated block cycle to test equipment; and
   controlling actuators of the test equipment to performing testing on a bushing based on the aggregated block cycle.

2. The method of claim 1 further comprising determining a loading block length for each loading block.

3. The method of claim 2 wherein the loading block length comprises a plurality of cycles.

4. The method of claim 1 wherein determining event data comprises determining the event data from a road test cycle.

5. The method of claim 1 wherein determining event data comprises determining the event data from simulated road test data.

6. The method of claim 1 wherein determining a block cycle comprises determining the block cycle comprising the maximum force and maximum force angular displacement at a first time and the minimum force and the minimum force angular displacement at a second time for the plurality of events.

7. A system for determining a block cycle for a bushing comprising:
   a controller programmed to
   determine event data for a plurality of events corresponding to operating conditions of a vehicle;
   determine a maximum force of the bushing and a maximum force angular displacement for the bushing at the maximum force and a minimum force and a minimum force angular displacement based on the event data for each of the plurality of events; and
   determine a block cycle comprising the maximum force and maximum force angular displacement and the minimum force and the minimum force angular displacement for the plurality of events;
   aggregate the plurality of block cycles to form an aggregated block cycle;
   communicate the aggregated block cycle to test equipment; and
   test equipment comprising actuators receiving the aggregate block cycle performing testing on a bushing by controlling the actuators based on the aggregate block cycle.

8. The system of claim 7 wherein the controller is programmed to determine a loading block length for each loading block.

9. The system of claim 8 wherein the loading block length comprises a plurality of cycles.

10. The system of claim 7 wherein the event data comprises data from a road test cycle.

11. The system of claim 7 wherein the event data comprises data from simulated road test data.

12. The system of claim 7 wherein the controller is programmed to determine the block cycle by determining the maximum force and maximum force angular displacement at a first time and the minimum force and the minimum force angular displacement at a second time for the plurality of events.

* * * * *